(12) United States Patent
Masters

(10) Patent No.: US 11,403,255 B1
(45) Date of Patent: Aug. 2, 2022

(54) MANAGING DISCOVERED CHIPLETS BASED ON PHYSICAL TOPOLOGY

(71) Applicant: Red Hat, Inc., Raleigh, NC (US)

(72) Inventor: Jonathan C. Masters, Boston, MA (US)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 17/361,655

(22) Filed: Jun. 29, 2021

(51) Int. Cl.
*G06F 15/78* (2006.01)

(52) U.S. Cl.
CPC .................. *G06F 15/7807* (2013.01)

(58) Field of Classification Search
CPC .................................................. G06F 15/7807
See application file for complete search history.

(56) References Cited

U.S. PATENT DOCUMENTS

| | | | |
|---|---|---|---|
| 8,001,394 B2 | 8/2011 | Bose et al. | |
| 2019/0384367 A1 | 12/2019 | Jain et al. | |
| 2020/0136906 A1 | 4/2020 | Guim Bernat et al. | |
| 2020/0387208 A1 | 12/2020 | Tsien et al. | |
| 2020/0409859 A1* | 12/2020 | Saleh | G06F 12/084 |
| 2021/0097013 A1* | 4/2021 | Saleh | G06F 12/0837 |

FOREIGN PATENT DOCUMENTS

EP 3761177 A1 1/2021

OTHER PUBLICATIONS

Mutschler, A., "Managing Power Dynamically," Dec. 18, 2019, Semiconductor Engineering, https://semiengineering.com/managing-power-dynamically/, 11 pages.
Ware, M. et al., "Architecting for Power Management: The IBM® POWER7™ Approach," The Sixteenth International Symposium on High-Performance Computer Architecture (HPCA -16), Jan. 9-14, 2010, Bangalore, India, IEEE, https://safari.ethz.ch/architecture/fall2017/lib/exe/fetch.php?media=ware_hpca2010.pdf, 11 pages.

* cited by examiner

*Primary Examiner* — Jacob Petranek
(74) *Attorney, Agent, or Firm* — Dority & Manning, P.A.

(57) ABSTRACT

Provided herein are implementations for managing discovered chiplets based on a physical topology. In particular, a method includes receiving, by a control chiplet, a discovery signal from a first subordinate chiplet, the control chiplet being a portion of a processing unit of a package. The method further includes determining, by the control chiplet, a physical topology of the first subordinate chiplet relative to the control chiplet based on the discovery signal. The method further includes managing, by the control chiplet, operation of the first subordinate chiplet based on the physical topology of the first subordinate chiplet.

20 Claims, 9 Drawing Sheets

MANAGING DISCOVERED CHIPLETS BASED ON PHYSICAL TOPOLOGY

BACKGROUND

As process nodes continue to decrease in size, chiplets are used to increase yields and decrease costs of manufacturing chips.

SUMMARY

Implementations for managing discovered chiplets based on a physical topology are provided herein. In particular, a method includes receiving, by a control chiplet, a discovery signal from a first subordinate chiplet, the control chiplet being a portion of a processing unit of a package. The method further includes determining, by the control chiplet, a physical topology of the first subordinate chiplet relative to the control chiplet based on the discovery signal. The method further includes managing, by the control chiplet, operation of the first subordinate chiplet based on the physical topology of the first subordinate chiplet.

In one implementation, a method is provided. The method includes receiving, by a control chiplet, a discovery signal from a first subordinate chiplet, the control chiplet being a portion of a processing unit of a package. The method further includes determining, by the control chiplet, a physical topology of the first subordinate chiplet relative to the control chiplet based on the discovery signal. The method further includes managing, by the control chiplet, operation of the first subordinate chiplet based on the physical topology of the first subordinate chiplet.

In another implementation, a computer system is provided. The computer system includes a control chiplet being a portion of a processing unit of a package. The control chiplet comprises a processor device to receive a discovery signal from a first subordinate chiplet. The processor device is further to determine a physical topology of the first subordinate chiplet relative to the control chiplet based on the discovery signal. The processor device is further to manage operation of the first subordinate chiplet based on the physical topology of the first subordinate chiplet.

In another implementation, a computer program product is stored on a non-transitory computer-readable storage medium of a control chiplet. The control chiplet is a portion of a processing unit of a package. The computer program product includes instructions to cause a processor device of a control chiplet to receive a discovery signal from a first subordinate chiplet. The processor device is further to determine a physical topology of the first subordinate chiplet relative to the control chiplet based on the discovery signal. The processor device is further to manage operation of the first subordinate chiplet based on the physical topology of the first subordinate chiplet.

Those skilled in the art will appreciate the scope of the disclosure and realize additional aspects thereof after reading the following detailed description of the implementations in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

Figure 1:
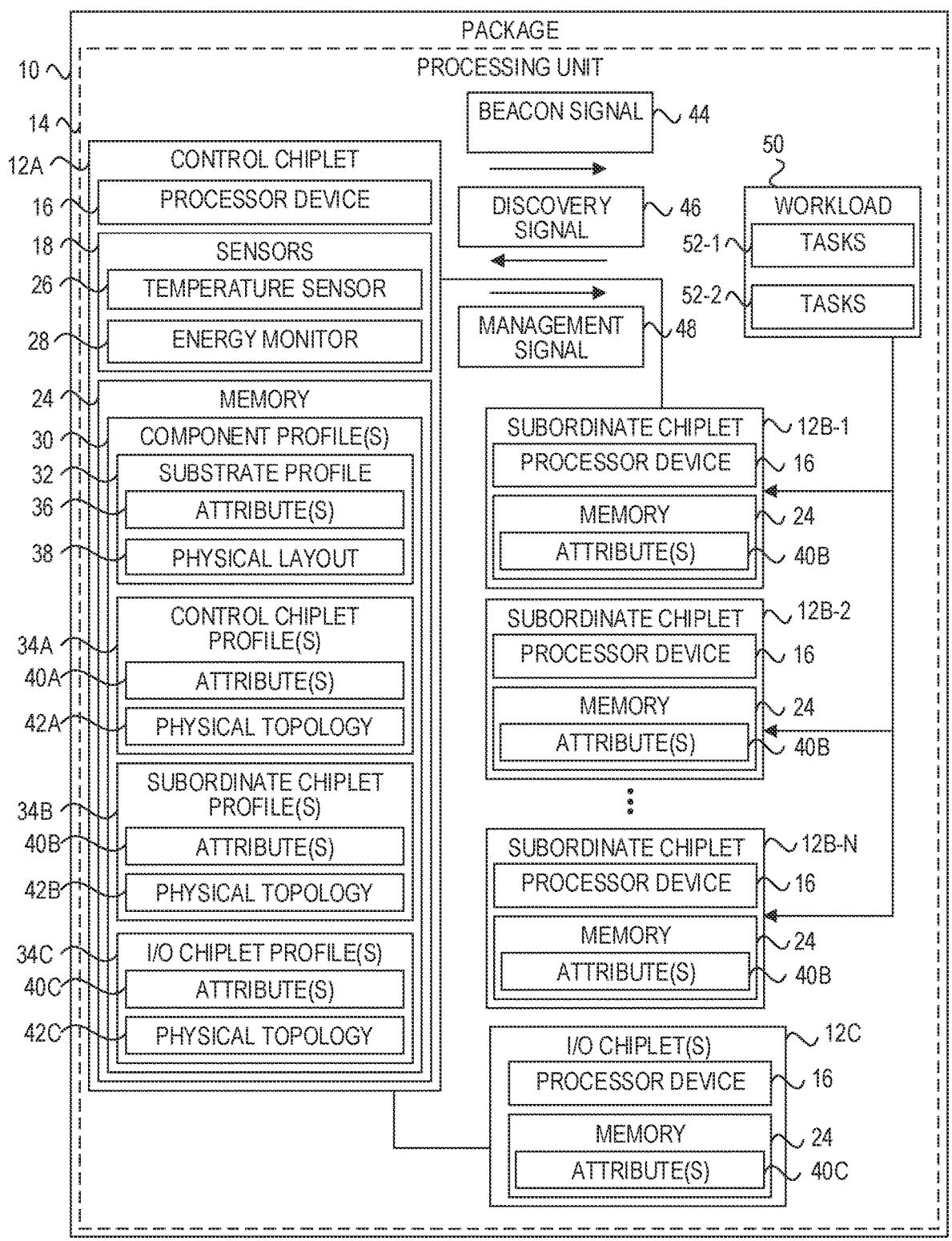
FIG. 1 is a block diagram of a package with a control chiplet for managing discovered chiplets based on physical topology, illustrating certain aspects of various implementations disclosed herein.

The implementations set forth below represent the information to enable those skilled in the art to practice the implementations and illustrate the best mode of practicing the implementations. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the implementations are not limited to any particular sequence of steps. The use herein of ordinals in conjunction with an element is solely for distinguishing what might otherwise be similar or identical labels, such as "first message" and "second message," and does not imply a priority, a type, an importance, or other attribute, unless otherwise stated herein. The term "about" used herein in conjunction with a numeric value means any value that is within a range of ten percent greater than or ten percent less than the numeric value.

As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B.

Implementations for managing discovered chiplets based on a physical topology are provided herein. In particular, a method includes receiving, by a control chiplet, a discovery signal from a first subordinate chiplet, the control chiplet being a portion of a processing unit of a package. The method further includes determining, by the control chiplet, a physical topology of the first subordinate chiplet relative to the control chiplet based on the discovery signal. The method further includes managing, by the control chiplet, operation of the first subordinate chiplet based on the physical topology of the first subordinate chiplet.

For advanced chip designs, the industry often develops a system on a chip (SoC), where different functions are packed onto a monolithic die. However, this approach is becoming complex and expensive. In part because the use of a monolithic die increases the need for tight manufacturing tolerances with little room for error or defects, or the entire die may have to be discarded.

Instead, chiplets are increasingly being used as an alternative design with lower costs and higher yields. With chiplets, manufacturers may integrate pre-developed dies in an integrated circuit (IC) package, such as with die-to-die interconnects. However, manufacturers often must know the exact design and configuration of an IC package prior to assembly to ensure proper functioning of the chiplets and the IC package. The chiplets of the IC package are ignorant to the physical topology of the IC package, requiring foresight and careful planning by the chip designer, such as by considering relative operation of each of the chiplets.

The examples disclosed herein implement managing discovered chiplets based on a physical topology. In particular, the examples utilize a control chiplet with a preloaded or discovered physical topology to manage subordinate chiplets based on the physical topology. Such a configuration provides more flexibility in chiplet design and manufacturing to manage relative operation of the chiplets, such as reducing thermal hotspots, increasing processing efficiency, and/or decreasing latency.

FIG. 1A is a block diagram of a package 10 with a control chiplet 12A for managing discovered chiplets 12B-1-12B-N, 12C based on a physical topology. The package 10 is an integrated circuit (IC) package or system on a chip (SoC). An SoC integrates all or most components of a computer, such as a central processing unit (CPU), memory, input/output (I/O) ports, graphics processing unit (GPU), and the like.

The package 10 includes a plurality of chiplets 12A, 12B-1-12B-N, 12C (may be referred to generally as chiplets 12) that form a processing unit 14 of the package 10. The processing unit 14 may include, for example, CPU, GPU, memory, communication, input/output, or the like. In certain implementations, the chiplets 12 form a two-dimensional assembly where the chiplets 12 are placed horizontally adjacent to one another. In certain implementations, the chiplets 12 form a three-dimensional assembly where the chiplets 12 may be placed horizontally adjacent to one another and/or stacked on top of one another.

Chiplets 12 are sub-processing units that collectively form a processing unit 14 of a package 10. A chiplet 12 has an integrated circuit block, often made of one or more reusable IP (intellectual property) blocks, designed to work with other chiplets 12 to form more complex chips. Chiplets 12 may have different functions at different nodes and provide a modular design to building of processing units 14. Further, chiplets 12 provide higher yields and thereby lower manufacturing costs compared to a monolithic chip. For example, if a defect is discovered in a CPU core of a monolithic chip, the entire chip must be discarded or sold as a lower model, such as with fewer cores. Comparatively, if a defect is detected in a chiplet 12, the chiplet 12 is discarded and replaced with another chiplet 12, so only a small portion of the package 10 must be discarded.

Each chiplet 12 includes a die, a functional circuit hosted by the die, and a physical interface. The die is pre-developed before integration into the package 10. The die is a small block of semiconducting material, such as silicon (EGS) and/or GaAs, on which a circuit is fabricated, such as by photolithography. The functional circuit relates to an IP block, providing some function of the package 10. For example, chiplets 12 may form CPU cores, GPU, memory, communication, input/output, or the like. The functional circuit may also be referred to as a processor device, although the processor device of the chiplet 12 forms only a portion of the processing unit 14 of the package 10. The physical interface may include a die-to-die interconnect to join one die to another die in the package 10. Die-to-die interconnects may include, for example, Advanced Interface Bus (AIB) Base, AIB Plus, CEI-112G-XSR, Bunch of Wires (BoW), OpenHBI, high-bandwidth memory (HBM), XRS, or the like.

The chiplets 12 include the control chiplet 12A, subordinate chiplets 12B-1-12B-N (referred to generally as subordinate chiplets 12B), and/or I/O chiplets 12C. The control chiplet 12A manages operation of the subordinate chiplets 12B. The I/O chiplet 12C communicates with computer devices and components external to the package 10 and sends those communications to the control chiplet 12A and/or subordinate chiplets 12B for processing. In certain implementations, the I/O chiplet 12C may include functionality of the control chiplet 12A, such that the I/O chiplet 12C is the control chiplet 12A. In certain implementations, the I/O chiplet 12C may be one of the subordinate chiplets 12B.

Each of the chiplets 12 may include a processor device 16, sensors 18, and/or a memory 24. Processor device 16, in relation to chiplets 12, refers to a functional circuit of the chiplet 12 that processes data, even though the chiplet 12 forms a portion of the processing unit 14. The sensors 18 may include a temperature sensor 26 and/or an energy monitor 28, or the like. The memory 24 may be a cache memory, which is a high-speed static random access memory (SRAM) that a computer can access quickly, more quickly than accessing random access memory (RAM). It is noted that for illustrative purposes to reduce space, only some of the chiplets 12 and other components are shown with a processor device 16, sensors 18, and/or a memory 24. However, each of the chiplets may include a processor device 16, sensors 18, and/or a memory 24. Further, each of the chiplets 12 may include a plurality of chiplets 12.

The control chiplet 12A stores component profiles 30 of various components of the package 10 in the memory 24. In particular, the component profiles 30 include a substrate profile 32 of the substrate, control chiplet profile 34A for the control chiplet 12, subordinate chiplet profiles 34B for the subordinate chiplets 12B, and/or I/O chiplet profiles 34C for the I/O chiplet 12C. The substrate profile 32 includes attribute(s) 36 and/or a physical layout 38 of the substrate. Attributes 36 of the substrate may include substrate identification, substrate type, physical dimensions, thermal information, or the like. For example, thermal information may include thermal limits or the like. Physical dimensions may include height, width, length, or the like. The physical layout 38 of the substrate may include the potential chiplet configurations, landing pad locations, trace wiring information, or the like. The potential chiplet configurations may include the designation and/or compatibility of landing pads with different types of chiplets 12.

Each chiplet profile 34A-34C of the chiplets 12A-12C includes attributes 40A-40C and/or a physical topology 42A-42C of the chiplet 12A-12C. The attributes 40A-40C may include chiplet identification, chiplet type, physical dimensions, thermal information, power information, and/or processing information, or the like. For example, thermal information may include thermal limit, and/or thermal output, or the like.

The physical topology 42A-42C is determined by the control chiplet 12A, as described below in more detail. The physical topology 42A-42C may include a physical topology 42A-42C relative to the control chiplet 12A, a physical topology 42A-42C relative to the substrate of the package 10, a physical topology 42A-42C relative to a subordinate chiplet 12B, a physical topology 42A-42C relative to an I/O chiplet 12C, or the like. For example, the physical topology 42A-42C may include a physical location of a chiplet 12B-12C relative to the control chiplet 12A. As another example, the physical topology 42A-42C may include a physical location of a chiplet 12A-12C relative to another chiplet 12A-12C.

In certain implementations, the control chiplet 12A sends a beacon signal 44 to the chiplets 12B, 12C requesting a discovery signal 46 in return to determine which chiplets 12B, 12C are in communication with the control chiplet 12A. In certain implementations, the chiplets 12B, 12C initiate the discovery signal 46. Whether the control chiplet 12A requests the discovery signal 46 may depend on whether the control chiplet 12A is mounted to the substrate and/or electrically connected before or after respective chiplets 12B, 12C. In this way, control chiplet 12A may send a beacon signal 44 only upon initial activation. Thereafter, the control chiplet 12A receives the discovery signal 46 from the chiplets 12B, 12C, when the chiplets 12B, 12C are initially activated.

The control chiplet 12A receives the discovery signal 46 from a subordinate chiplet 12B and/or from an I/O chiplet 12C. The discovery signal 46 may include attributes 40A, 40B of the chiplets 12B, 12C. As noted above, the attributes 40A, 40B may include chiplet identification, chiplet type, physical dimensions, thermal information, power information, and/or processing information, or the like. Accordingly, the control chiplet 12A discovers the chiplet 12B, 12C and relevant operation and physical characteristics of the chiplet 12B, 12C.

From the physical layout 38 of the substrate and/or from the attributes 36, 40A-40C of the substrate, control chiplet 12A, subordinate chiplets 12B, and/or I/O chiplet 12C the control chiplet 12A determines a physical topology 42A-42C of the chiplets 12A-12C. In certain implementations, the control chiplet 12A determines the physical topology 42A-42C based on preexisting knowledge of the physical layout 38 of the substrate of the package 10 and/or based on knowledge derived of the physical layout 38 of the substrate of the package 10, such as by determining which pin of the control chiplet 12A received the discovery signal 46. In certain implementations, the control chiplet 12A determines the physical topology 42A-42C based on attributes 36 of the substrate received from another source, such as an external source or a designated chiplet associated with the substrate. In certain implementations, the control chiplet 12A determines the physical topology 42A-42C based on relative interaction of the chiplets 12A-12C. For example, if chiplet 12A receives the discovery signal 46 from a first subordinate chiplet 12B-1 through a second subordinate chiplet 12B-2, then the control chiplet 12A may assume that the first subordinate chiplet 12B-1 is physically farther away from the control chiplet 12A than the second subordinate chiplet 12B-2.

The control chiplet 12A may monitor sensors 18 of the chiplets 12 to manage operation of the chiplets 12 using management signals 48, such as to ensure that the chiplets 12 operate within temperature limits, with increased processing efficiency, and/or reduced latency, or the like. When the processing unit 14 of the package 10 receives a workload 50, the tasks 52-1, 52-2 of the workload 50 are divided between a plurality of subordinate chiplets 12B, the control chiplet 12A may manage operation of the subordinate chiplets 12B based on attributes 36 and physical layout 38 of the substrate, based on attributes 40A-40C and physical topology 42A-42C of the chiplets 12, and/or workload 50, or the like. The control chiplet 12A may manage these depending on relative operation of the chiplets 12. Managing operation may include managing processing load, processing speed, power output, and/or thermal output, or the like across one or more chiplets 12.

For example, if a first subordinate chiplet 12B-1 has a maximum thermal output that would potentially damage a neighboring second subordinate chiplet 12B-2, the control chiplet 12A can manage operation of the first subordinate chiplet 12B-1 to protect the functioning of the second subordinate chiplet 12B-2. The control chiplet 12A may redistribute tasks 52-1, 52-2 to maximize efficiency among subordinate chiplets 12B. For example, control chiplet 12A may determine that because of the physical topology 42B of two identical subordinate chiplets 12B-1, 12B-2, the control chiplet 12A may need to throttle processing of the first subordinate chiplet 12B-1, but would not have to throttle processing of the second subordinate chiplet 12B-2. Accordingly, the control chiplet 12A may assign a heavier task to the second subordinate chiplet 12B-2 and a lighter task to the first subordinate chiplet 12B-1, thereby optimizing processing efficiency. Further, the control chiplet 12A may prioritize distribution of a task 52-1, 52-2 to a subordinate chiplet 12B that is closest to the I/O chiplet 12C to reduce latency.

Figure 2:
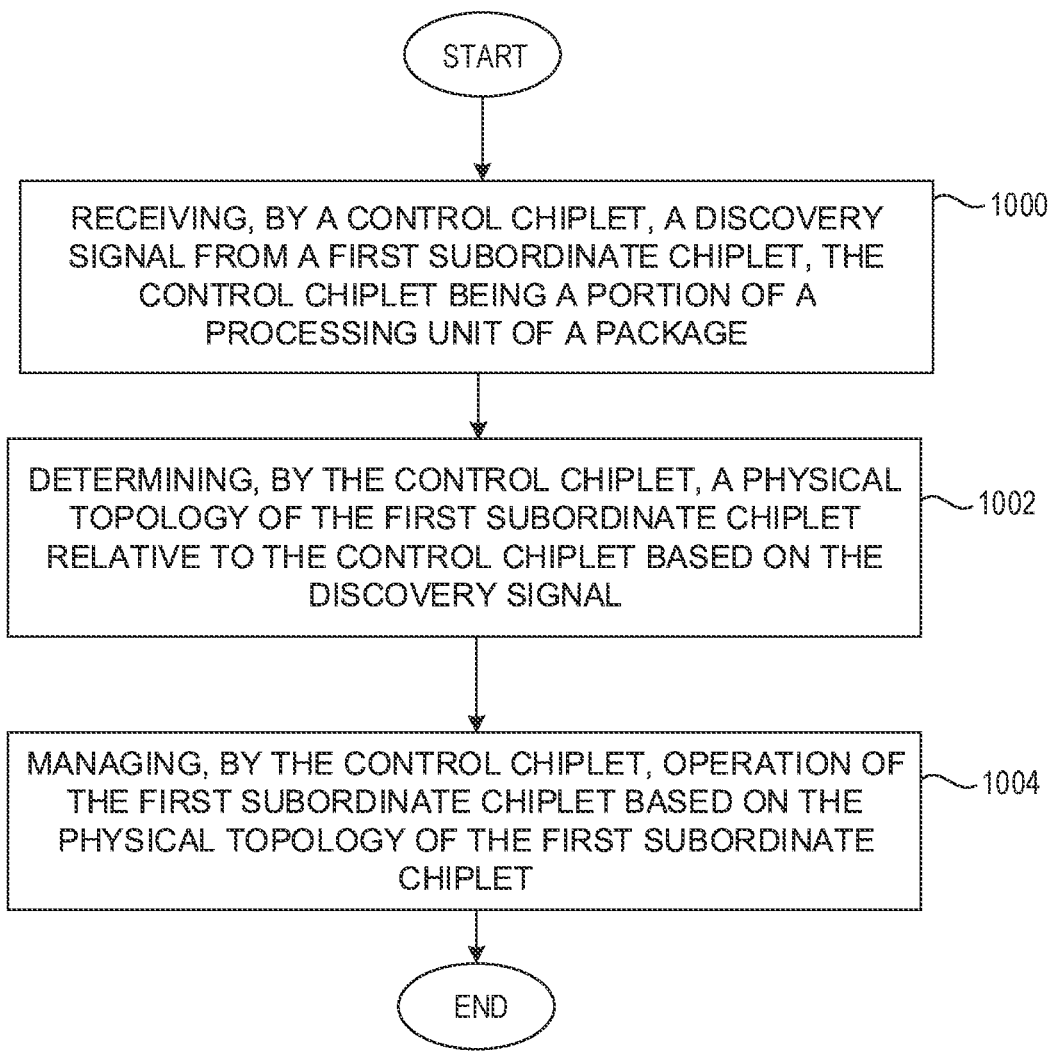
FIG. 2 is a flowchart illustrating processing steps for managing discovered chiplets based on physical topology.

FIG. 2 is a flowchart illustrating processing steps for managing discovered chiplets based on physical topology. FIG. 2 will be discussed in conjunction with FIG. 1. A control chiplet receives a discover signal from a first subordinate chiplet, with the control chiplet being configured to be a portion of a processing unit of a package (1000). The control chiplet determines a physical topology of the first subordinate chiplet relative to the control chiplet based on the discovery signal (1002). The control chiplet manages operation of the first subordinate chiplet based on the physical topology of the first subordinate chiplet (1004).

Figure 3A:
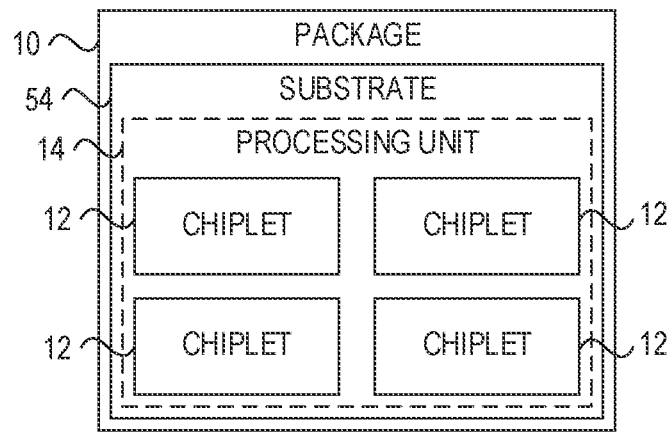
FIG. 3A is a top view of a package with a plurality of chiplets.
Figure 3B:
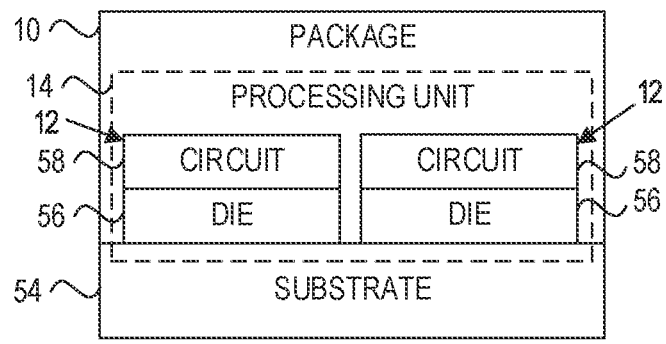
FIG. 3B is a side view of the package of FIG. 3A with the plurality chiplets.

FIGS. 3A-3B are views of a package 10 with a plurality of chiplets 12 mounted to a substrate 54. As noted above, the chiplets 12 form a processing unit 14. Each of the chiplets 12 includes a die 56 and a functional circuit 58. As noted above, each of the chiplets 12 includes their own die 56. The chiplets 12 are mounted to one side of the substrate 54. However, in other implementations, the chiplets 12 may be mounted to both sides of the substrate 54. As noted above, in certain implementations, the chiplets 12 may be stacked in a three-dimensional configuration.

Figure 3C:
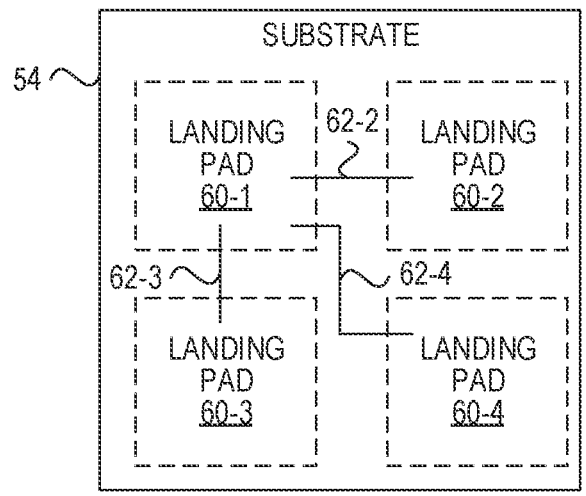
FIG. 3C is a top view of a substrate with a plurality of landing pads illustrating prewiring of one landing pad to other landing pads.

FIG. 3C is a view of the substrate 54 of FIG. 3A illustrating a plurality of landing pads 60-1-60-4 (referred to generally as landing pads 60). The substrate 54 is prewired such that each of the landing pads is electrically connected by electrical traces 62-2-62-4 (may be referred to generally as electrical traces 62) to at least some of the other landing pads 60-2-60-4. For example, landing pad 60-1 is electrically connected to each of the landing pads 60-2-60-4 by electrical traces 62-2-62-4, respectively. Accordingly, with knowledge of the substrate 54, communication by a chiplet 12 at landing pad 60-1 with another chiplet 12 along an electrical trace 62-2 indicates the location of that chiplet 12 at landing pad 60-2. Although electrical traces 62 are shown for landing pads 60-1, it is noted that each of the other landing pads 60-2-60-4 may be similarly wired to one or more of the other landing pads 60.

Figure 4:
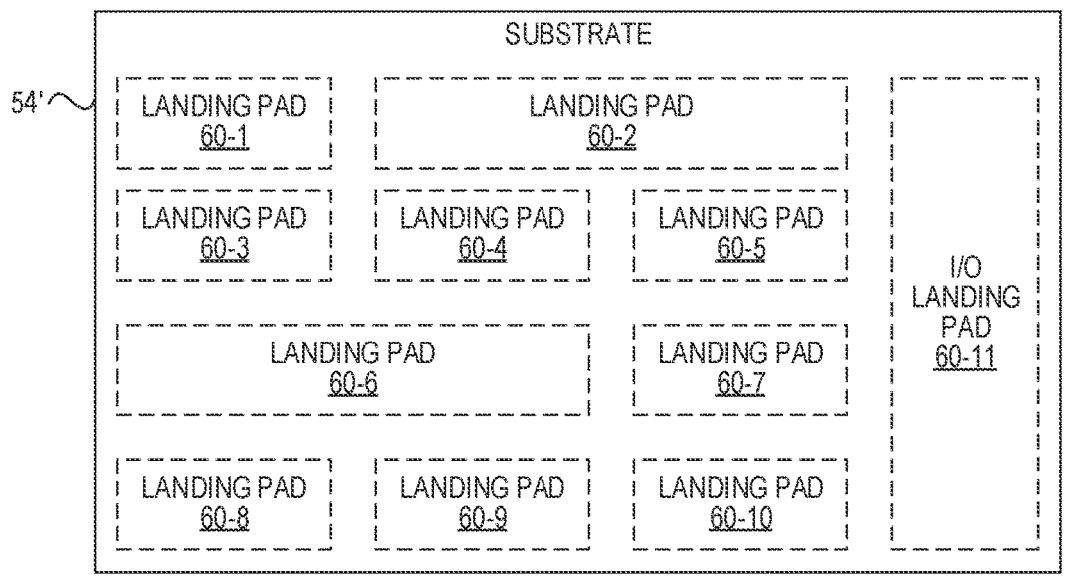
FIG. 4 is a top view of one implementation of a substrate with a plurality of landing pads.

FIG. 4 is a top view of one implementation of a substrate 54' with a plurality of landing pads 60-1-60-11 (referred to generally as landing pads 60). Different substrates 54' have different physical layouts 38 (see FIG. 1) and/or landing pads 60 of different sizes. Some landing pads 60 may be designated for certain chiplets 12. For example, I/O Landing pad 60-11 is at an edge of the substrate 54' and is designated for the I/O chiplet 12C (see FIG. 1) due to proximity to the edge of the substrate 54'. Other landing pads 60 are generic to the type of chiplet 12 that may be placed at that landing pad 60.

Figure 5:
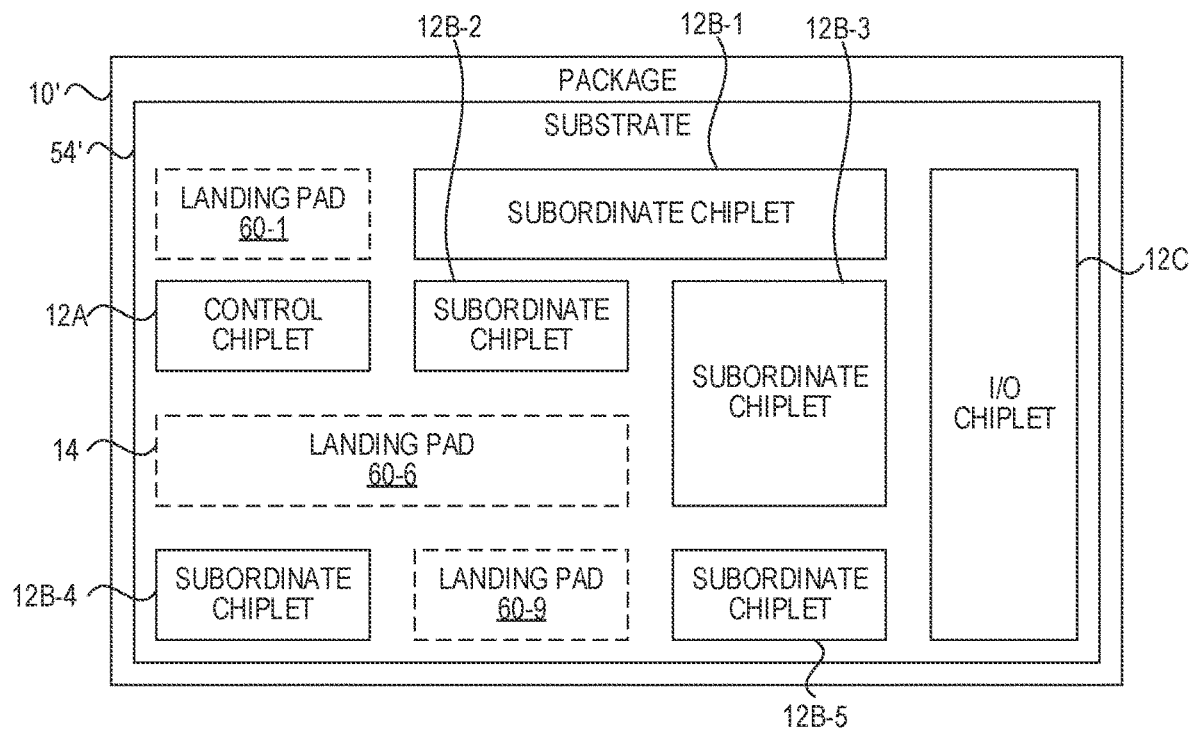
FIG. 5 is a top view of a package with a plurality of chiplets mounted to the substrate of FIG. 4.

FIG. 5 is a top view of a package 10' with a plurality of chiplets 12 mounted to the substrate 54' of FIG. 4. As illustrated, chiplets 12 may be placed at some or all of the landing pads 60. Further, chiplets 12 may cover one or more landing pads 60. For example, chiplet 12B-3 is placed over landing pads 60-5, 60-7 (see FIG. 4).

The control chiplet 12A receives, prior to mounting the control chiplet 12A to the substrate 54' of the package 10', a physical layout 38 (see FIG. 1) for at least one substrate type. The control chiplet 12A may be preloaded with only one type of substrate 54' or with multiple types of substrates 54'. When mounted to the substrate 54', the control chiplet 12A determines a substrate type of the substrate 54' of the package 10' and the physical layout 38 of the substrate 54'. The control chiplet 12A may determine these features by the locations and/or types of chiplets 12B, 12C communicating with the control chiplet 12A. The control chiplet 12A determines the physical topology 42 of the subordinate chiplets 12B and/or I/O chiplet 12C relative to the control chiplet 12A based on the discovery signals 46 (see FIG. 1) and the physical layout 38 of the substrate 54'.

Figure 6:
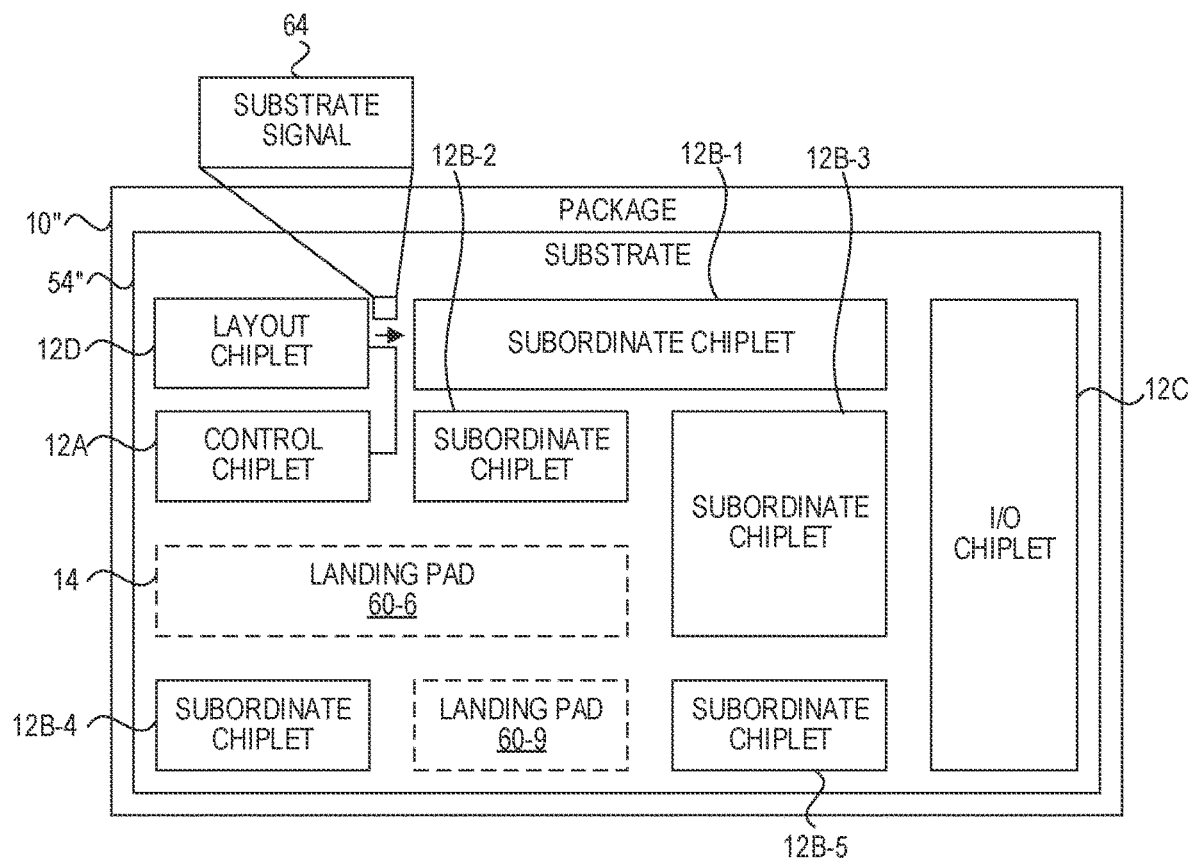
FIG. 6 is a top view of one implementation of a substrate with a plurality of landing pads and a layout chiplet providing attributes of the substrate to the control chiplet.

FIG. 6 is a top view of one implementation of a substrate 54" with a layout chiplet 12D. As noted above, different substrates 54" have different physical layouts 38 (see FIG. 1) and/or landing pads 60 of different sizes where some landing pads 60 may be designated for certain chiplets 12, while other landing pads 60 are generic to the type of chiplet 12 that may be placed at that landing pad 60. As similarly noted above, chiplets 12 may be placed at some or all of the landing pads 60. In this implementation, a layout chiplet 12D is provided at the first landing pad 60-1 (see FIG. 4). The layout chiplet 12D may be part of the substrate 54" or may be mounted to the substrate 54" prior to or after the control chiplet 12A.

The control chiplet 12A receives, after mounting the control chiplet 12A to the substrate 54" of the package 10", a substrate signal 64 from the layout chiplet 12D. The substrate signal 64 includes a physical layout 38 (see FIG. 1) of the substrate 54". The control chiplet 12A determines the physical topology 42B, 42C of the chiplets 12B-12D relative to the control chiplet 12A based on the discovery signal 46 (see FIG. 1) and the physical layout 38 of the substrate 54". In such an implementation, the control chiplet 12A does not need to be preloaded with any knowledge of the substrate 54". Instead, the layout chiplet 12D informs the control chiplet 12A as to the specific substrate 54" that the control chiplet 12A is mounted to.

Figure 7:
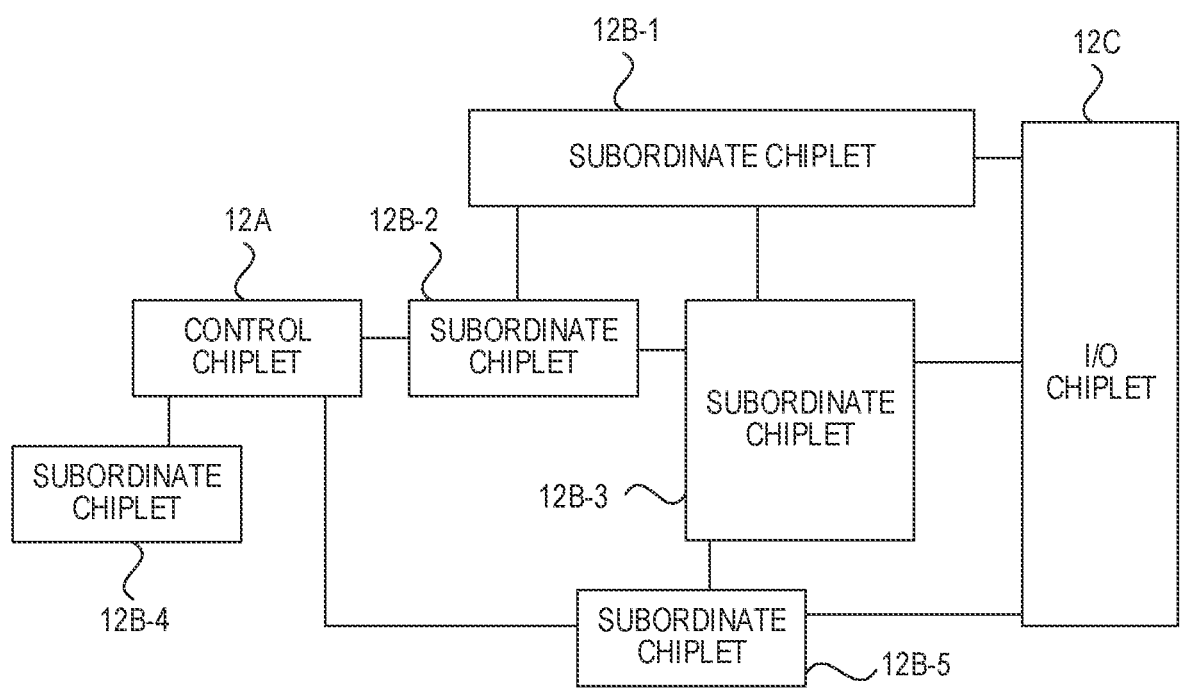
FIG. 7 is a block diagram illustrating a control chiplet discovering other chiplets without knowledge of a substrate.

FIG. 7 is a block diagram illustrating a control chiplet 12A discovering other chiplets 12B, 12C without knowledge of a substrate 54, 54', 54" (see FIGS. 3A-6). Instead, the control chiplet 12A makes certain assumptions and inferences based on the attributes 40B, 40C of the chiplets 12B, 12C, and/or the communication paths of the chiplets 12B, 12C. For example, if the control chiplet 12A receives the discovery signal 46 (see FIG. 1) from the first subordinate chiplet 12B-1 through a second subordinate chiplet 12B-2, the control chiplet 12A determines the physical topology 42A, 42B of the first subordinate chiplet 12B-1 relative to the control chiplet 12A based on the discovery signal 46. The physical topology 42A, 42B includes that the first subordinate chiplet 12B-1 is physically farther from the control chiplet 12A than the second subordinate chiplet 12B-2.

It is noted that for the packages 10, 10', 10" discussed above, a range of specificity may be provided to the control chiplet 12A, where the control chiplet 12A may be more or less certain based on the specifics of the substrate 54, 54', 54" provided to the control chiplet 12A.

Figure 8:
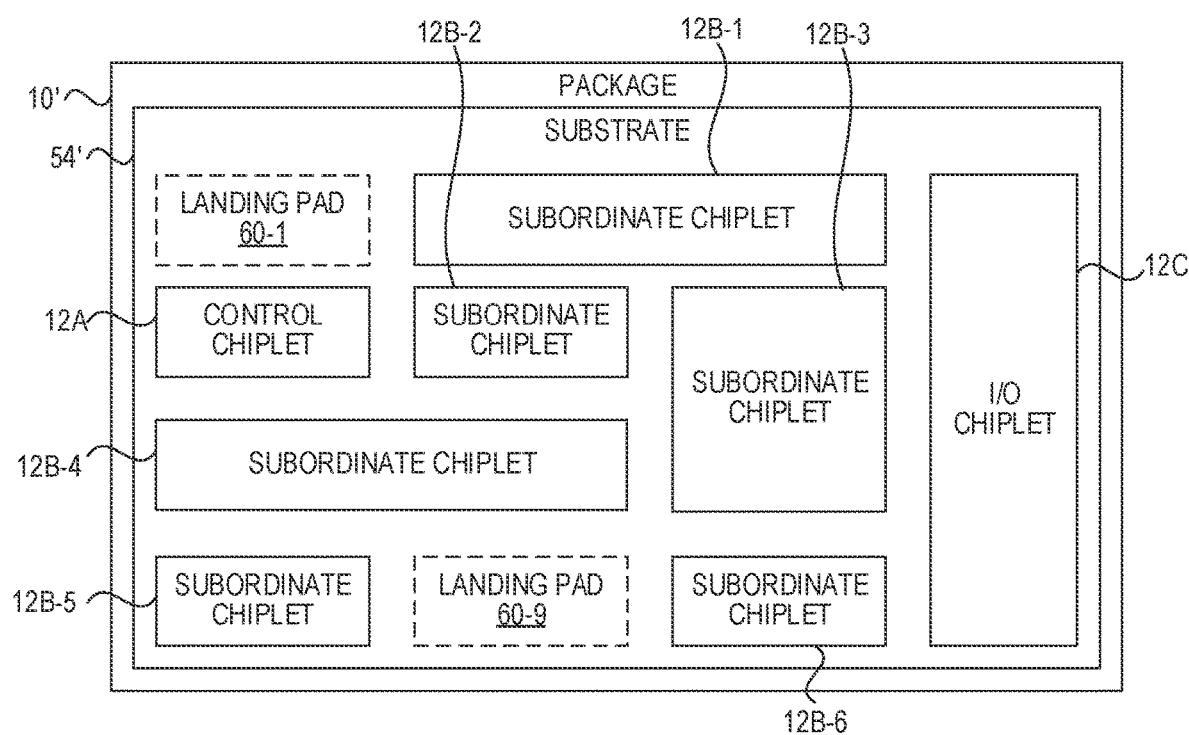
FIG. 8 is a block diagram illustrating a control chiplet managing subordinate chiplets.

FIG. 8 is a block diagram illustrating a control chiplet 12A managing subordinate chiplets 12B. Control chiplet 12A manages operation of the chiplets 12B based on relative positioning of the chiplets 12. For example, the control chiplet 12A monitors operation of a first subordinate chiplet 12B-1 and a second subordinate chiplet 12B-2. The control chiplet 12A manages operation of the first subordinate chiplet 12B-1 based on the physical topology 42B of the subordinate chiplets 12B-1, 12B-2, and/or relative operation of the subordinate chiplets 12B-1, 12B-2.

The first subordinate chiplet 12B-1 has a first thermal limit, first maximum power output, and/or first maximum processing. The first subordinate chiplet 12B-1, has a first topology 42B that is a first distance from the I/O chiplet 12C and/or next to empty landing pad 60-1. The second subordinate chiplet 12B-2 has a second thermal limit, second maximum power output, and/or second maximum processing. The second subordinate chiplet, 12B-1, has a second topology 42B that is a second distance from the I/O chiplet 12C and/or at least partially surrounded by other chiplets 12A, 12B-1, 12B-3.

As an example, control chiplet 12A receives thermal information of the second temperature sensor 26 (see FIG. 1) of the second subordinate chiplet 12B-2. The control chiplet 12A limits thermal output of the first subordinate chiplet 12B-1 based on the physical topology 42B of the first subordinate chiplet 12B-1 and/or the second subordinate chiplet 12B-1 to maintain a temperature at the second subordinate chiplet 12B-2 within temperature limits of the second subordinate chiplet 12B-2. In certain implementations, the control chiplet 12A limits thermal output of the first subordinate chiplet 12B-1 by throttling power to the first subordinate chiplet 12B-1, reducing processing load of the first subordinate chiplet 12B-1, and/or imposing a temperature output limit on the first subordinate chiplet 12B-1, or the like.

Control chiplet 12A may also receive power information from an energy monitor 28 (see FIG. 1) of the second subordinate chiplet 12B-2. The control chiplet 12A may delegate assignment of a task 52-1, 52-2 of a workload 50 (see FIG. 1) to the first subordinate chiplet 12B-1 based on the physical topology 42B of the first subordinate chiplet 12B-1 to maximize processing efficiency of the workload 50 by the package 10. For example, the first subordinate chiplet 12B-1 and the second subordinate chiplet 12B-2 each have the same maximum processing limit. However, the second subordinate chiplet, 12B-1 is throttled to prevent overheating the neighboring second subordinate chiplet 12B-2. Instead, the control chiplet 12A assigns the task 52-1, 52-2 to subordinate chiplet 12B-5, which is more isolated than the second subordinate chiplet 12B-2 and can operate at maximum power.

In certain implementations, the control chiplet 12A delegates assignment of a task 52-1, 52-2 of a workload 50 to the first subordinate chiplet 12B-1 based on the physical topology 42B of the first subordinate chiplet 12B-1 to minimize latency. For example, the control chiplet 12A may determine the physical topology 42B of the first subordinate chiplet 12B-1 relative to the control chiplet 12A and an I/O chiplet 12C based on the discovery signal 46 (see FIG. 1). The control chiplet 12A delegates assignment of a task 52-1, 52-2 of a workload 50 to the first subordinate chiplet 12B-1 based on the physical topology 42B of the first subordinate chiplet 12B-1 to minimize latency with the I/O chiplet 12C. The first subordinate chiplet, 12B-1 is physically closer to the I/O chiplet 12C than the second subordinate chiplet 12B-1. Accordingly, for certain workloads 50 or tasks 52-1, 52-2, the control chiplet 12A may prioritize forwarding the workload 50 or tasks 52-1, 52-2 to the first subordinate chiplet 12B-1.

In certain implementations, the control chiplet 12A determines a fault issue with the first subordinate chiplet 12B-1. The control chiplet 12A turns off the first subordinate chiplet 12B-1 to contain and isolate the fault issue. Any tasks 52-1, 52-2 assigned to the first subordinate chiplet 12B-1 may instead be reassigned to the second subordinate chiplet 12B-2. This provides greater flexibility in management and control of chiplets 12.

Figure 9:
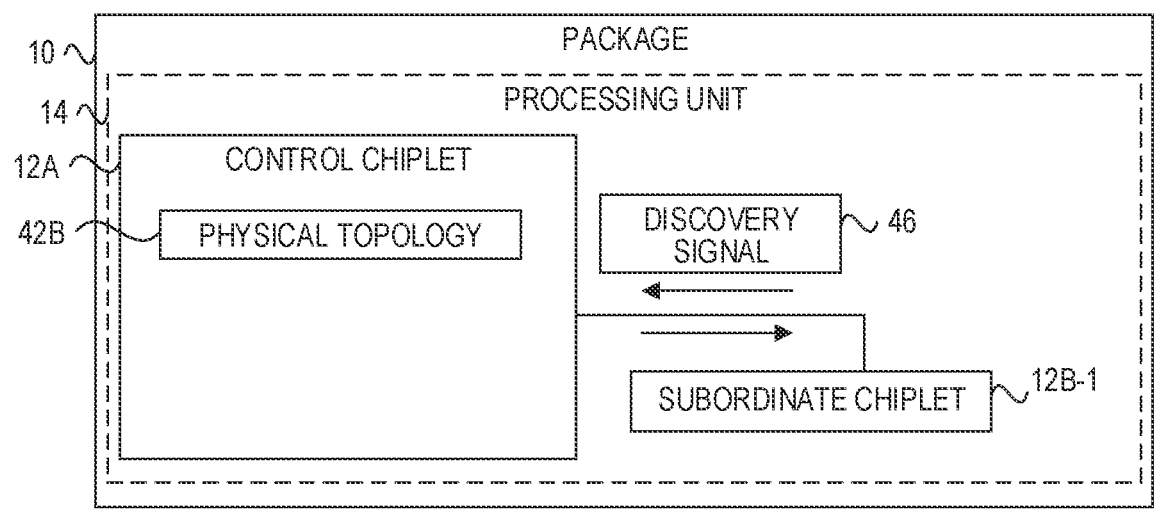
FIG. 9 is a simplified block diagram of the system illustrated in FIG. 1 according to another implementation.

FIG. 9 is a simplified block diagram of the package 10 illustrated in FIG. 1 according to another implementation. The package 10 includes a control chiplet 12A receiving a discovery signal 46 from a first subordinate chiplet 12B-1. The control chiplet is a portion of a processing unit 14 of a package 10. The control chiplet 12A determines a physical topology 42B of the first subordinate chiplet 12B-1 relative to the control chiplet 12A based on the discovery signal 46. The control chiplet 12A manages operation of the first subordinate chiplet 12B-1 based on the physical topology 42B of the first subordinate chiplet 12B-1.

Figure 10:
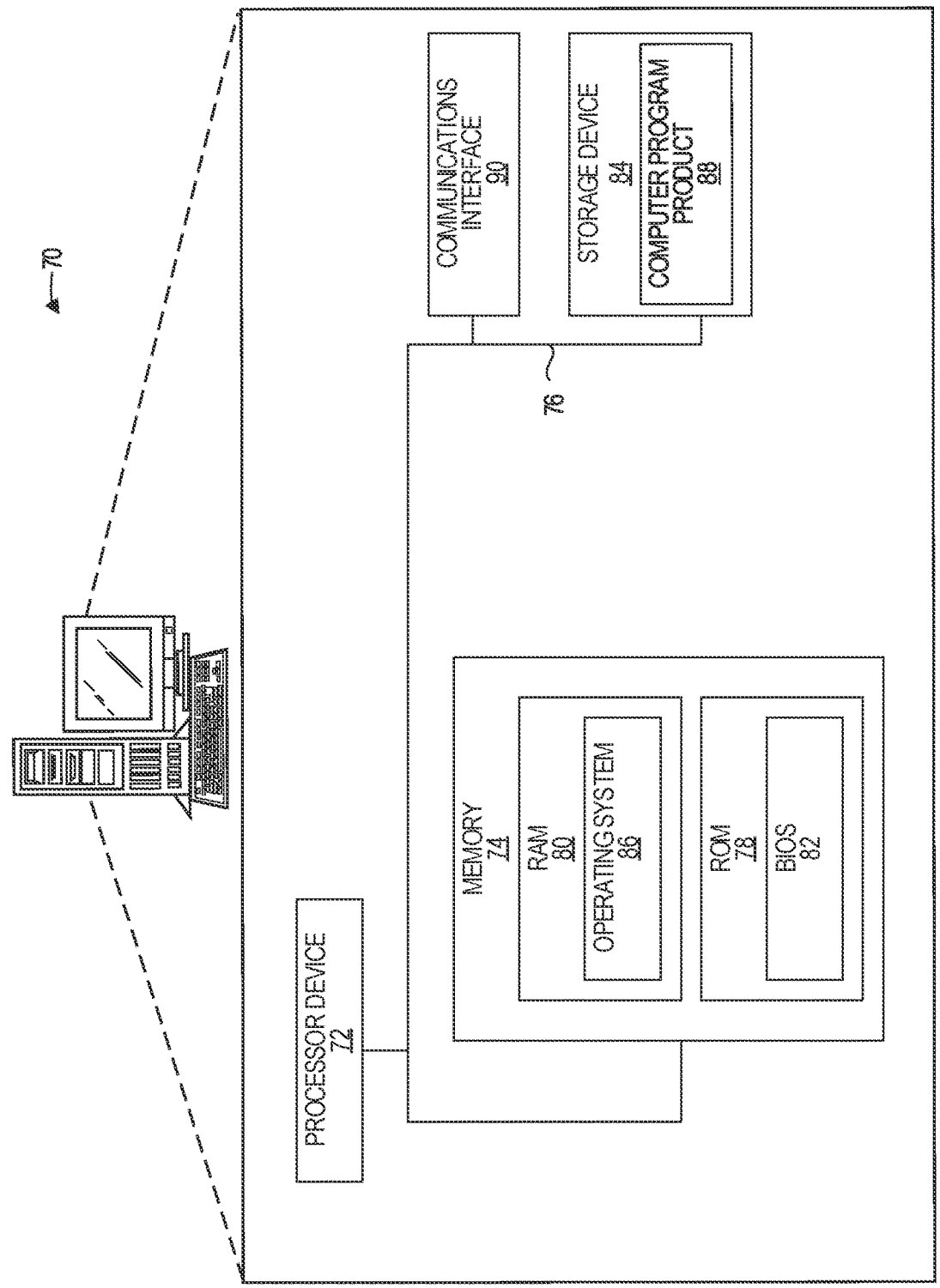
FIG. 10 is a block diagram of a computing device suitable for implementing one or more of the processing devices disclosed herein, according to one implementation.

FIG. 10 is a block diagram of a computing device 70 containing components suitable for implementing any of the processing devices disclosed herein. The computing device 70 includes a processor device 72, a system memory 74, and a system bus 76. The system bus 76 provides an interface for system components including, but not limited to, the system memory 74 and the processor device 72. The processor device 72 can be any commercially available or proprietary processor.

The system bus 76 may be any of several types of bus structures that may further interconnect to a memory bus (with or without a memory controller), a peripheral bus, and/or a local bus using any of a variety of commercially available bus architectures. The system memory 74 may include non-volatile memory 78 (e.g., read-only memory (ROM), erasable programmable read-only memory (EPROM), electrically erasable programmable read-only memory (EEPROM), etc.), and volatile memory 80 (e.g., random-access memory (RAM)). A basic input/output system (BIOS) 82 may be stored in the non-volatile memory 78 and can include the basic routines that help transfer information between elements within the computing device 70. The volatile memory 80 may also include a high-speed RAM, such as static RAM, for caching data.

The computing device 70 may further include or be coupled to a non-transitory computer-readable storage medium such as the storage device 84, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 84 and other drives associated with computer-readable media and computer-usable media may provide non-volatile storage of data, data structures, computer-executable instructions, and the like.

A number of modules can be stored in the storage device 84 and in the volatile memory 80, including an operating system 86 and one or more program modules, which may implement the functionality described herein in whole or in part. All or a portion of the examples may be implemented as a computer program product 88 stored on a transitory or non-transitory computer-usable or computer-readable storage medium, such as the storage device 84, which includes complex programming instructions, such as complex computer-readable program code, to cause the processor device 72 to carry out the steps described herein. Thus, the computer-readable program code can comprise software instructions for implementing the functionality of the examples described herein when executed on the processor device 72. The processor device 72, in conjunction with the network manager in the volatile memory 80, may serve as a controller or control system for the computing device 70 that is to implement the functionality described herein.

The computing device 70 may also include one or more communication interfaces 90, depending on the particular functionality of the computing device 70. The communication interfaces 90 may comprise one or more wired Ethernet transceivers, wireless transceivers, fiber, satellite, and/or coaxial interfaces by way of non-limiting examples.

Those skilled in the art will recognize improvements and modifications to the preferred implementations of the disclosure. All such improvements and modifications are considered within the scope of the concepts disclosed herein and the claims that follow.

What is claimed is:

1. A method, comprising:
   receiving, by a control chiplet, a discovery signal from a first subordinate chiplet, the control chiplet being a portion of a processing unit of a package;
   determining, by the control chiplet, a physical topology of the first subordinate chiplet relative to the control chiplet based on the discovery signal; and
   managing, by the control chiplet, operation of the first subordinate chiplet based on the physical topology of the first subordinate chiplet.

2. The method of claim 1, wherein each of the control chiplet and the first subordinate chiplet includes a die to mount to a substrate of the package.

3. The method of claim 1,
   wherein the discovery signal comprises an attribute of the first subordinate chiplet, the attribute including at least one of chiplet type, physical dimensions, thermal information, power information, or processing information; and
   wherein the thermal information includes at least one of thermal limit or thermal output.

4. The method of claim 3,
   wherein the control chiplet creates a profile of the first subordinate chiplet based on the attribute and the physical topology of the first subordinate chiplet, the profile including at least one of the chiplet type, the physical dimensions, the thermal information, the power information, the processing information, or the physical topology; and wherein the physical topology includes at least one of physical topology relative to the control chiplet, physical topology relative to a substrate of the package, physical topology relative to a second subordinate chiplet, or physical topology relative to an I/O chiplet.

5. The method of claim 1, further comprising receiving, by the control chiplet, a physical layout of a substrate of the package.

6. The method of claim 5, wherein the physical layout includes landing positions for chiplets.

7. The method of claim 6, wherein each of the landing positions is able to receive a plurality of different types of chiplets.

8. The method of claim 1,
further comprising:
  receiving, by the control chiplet prior to mounting the control chiplet to a substrate of the package, a physical layout for at least one substrate type;
  determining, by the control chiplet, a substrate type of the substrate of the package and the physical layout of the substrate; and
  wherein determining, by the control chiplet, the physical topology of the first subordinate chiplet relative to the control chiplet based on the discovery signal further includes determining, by the control chiplet, the physical topology of the first subordinate chiplet relative to the control chiplet based on the discovery signal and the physical layout of the substrate.

9. The method of claim 1,
further comprising receiving, by the control chiplet after mounting the control chiplet to a substrate of the package, a substrate signal including a physical layout of the substrate; and
  wherein determining, by the control chiplet, the physical topology of the first subordinate chiplet relative to the control chiplet based on the discovery signal further includes determining, by the control chiplet, the physical topology of the first subordinate chiplet relative to the control chiplet based on the discovery signal and the physical layout of the substrate.

10. The method of claim 1,
wherein receiving, by the control chiplet, the discovery signal from the first subordinate chiplet further includes receiving, by the control chiplet, the discovery signal from the first subordinate chiplet through a second subordinate chiplet; and
  wherein determining, by the control chiplet, the physical topology of the first subordinate chiplet relative to the control chiplet based on the discovery signal further includes determining, by the control chiplet, the physical topology of the first subordinate chiplet relative to the control chiplet based on the discovery signal, the physical topology comprising the first subordinate chiplet is physically farther from the control chiplet than the second subordinate chiplet.

11. The method of claim 1, wherein operation comprises at least one of processing load, processing speed, power output, or thermal output.

12. The method of claim 1,
further comprising monitoring, by the control chiplet, operation of a second subordinate chiplet;
  wherein managing, by the control chiplet, operation of the first subordinate chiplet based on the physical topology of the first subordinate chiplet further comprises managing, by the control chiplet, operation of the first subordinate chiplet based on the physical topology of the first subordinate chiplet and relative operation of the second subordinate chiplet.

13. The method of claim 1,
further comprising receiving, by the control chiplet, thermal information of a temperature sensor of a second subordinate chiplet; and
  wherein managing, by the control chiplet, operation of the first subordinate chiplet based on the physical topology of the first subordinate chiplet further comprises limiting thermal output of the first subordinate chiplet based on the physical topology of the first subordinate chiplet to maintain a temperature at the second subordinate chiplet within temperature limits of the second subordinate chiplet.

14. The method of claim 12, wherein limiting thermal output of the first subordinate chiplet further comprises at least one of:
  throttling power to the first subordinate chiplet;
  reducing processing load of the first subordinate chiplet; or
  imposing temperature output limit on the first subordinate chiplet.

15. The method of claim 1,
further comprising receiving, by the control chiplet, power information of an energy monitor of a second subordinate chiplet; and
  wherein managing, by the control chiplet, operation of the first subordinate chiplet based on the physical topology of the first subordinate chiplet further comprises delegating assignment of a task of a workload to the first subordinate chiplet based on the physical topology of the first subordinate chiplet to maximize processing efficiency of the workload by the package.

16. The method of claim 1,
wherein managing, by the control chiplet, operation of the first subordinate chiplet based on the physical topology of the first subordinate chiplet further comprises delegating assignment of a task of a workload to the first subordinate chiplet based on the physical topology of the first subordinate chiplet to minimize latency.

17. The method of claim 1,
wherein determining, by the control chiplet, the physical topology of the first subordinate chiplet relative to the control chiplet based on the discovery signal further comprises determining, by the control chiplet, the physical topology of the first subordinate chiplet relative to the control chiplet and an I/O chiplet based on the discovery signal; and
  wherein managing, by the control chiplet, operation of the first subordinate chiplet based on the physical topology of the first subordinate chiplet further comprises delegating assignment of a task of a workload to the first subordinate chiplet based on the physical topology of the first subordinate chiplet to minimize latency with the I/O chiplet.

18. The method of claim 1, further comprising:
determining, by the control chiplet, a fault issue with the first subordinate chiplet; and
turning off the first subordinate chiplet to contain and isolate the fault issue.

19. A computer system, comprising:
a control chiplet being a portion of a processing unit of a package, the control chiplet comprising a processor device to:
receive a discovery signal from a first subordinate chiplet;

determine a physical topology of the first subordinate chiplet relative to the control chiplet based on the discovery signal; and manage operation of the first subordinate chiplet based on the physical topology of the first subordinate chiplet.

20. A computer program product stored on a non-transitory computer-readable storage medium of a control chiplet, the control chiplet being a portion of a processing unit of a package, the computer program product including instructions to cause a processor device of the control chiplet to:

receive a discovery signal from a first subordinate chiplet;

determine a physical topology of the first subordinate chiplet relative to the control chiplet based on the discovery signal; and manage operation of the first subordinate chiplet based on the physical topology of the first subordinate chiplet.

\* \* \* \* \*